Nov. 1, 1932. S. W. CHESNUTT 1,885,990
SWIVEL CASTER
Filed June 16, 1930
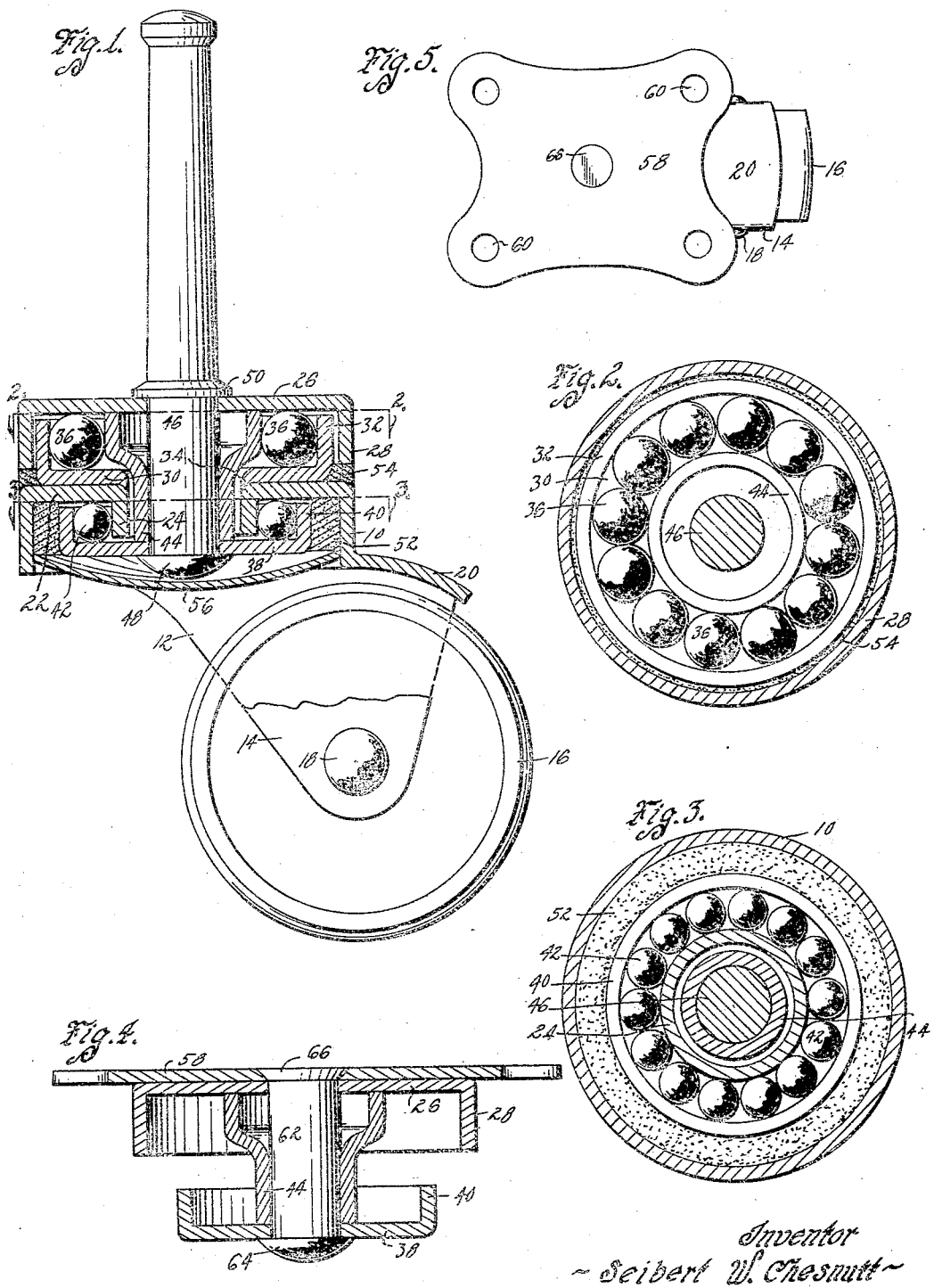
Witness
H. S. Mungenmaier
Inventor
~Seibert W. Chesnutt~
by Bair, Freeman & Sinclair
Attorneys Patented Nov. 1, 1932

1,885,990

UNITED STATES PATENT OFFICE

SEIBERT W. CHESNUTT, OF KANSAS CITY, MISSOURI

SWIVEL CASTER

Application filed June 16, 1930. Serial No. 461,543.

The primary object of this invention is to provide an improved construction for a double ball bearing swivel caster so designed as to be quick acting, strong and durable, and easily and economically manufactured.

Another object of the invention is to provide an improved arrangement of the swiveling parts of a caster, whereby the assembly will provide a chamber adapted to contain lubricating material designed to add to the efficiency and lasting qualities of the swiveling parts.

Still another object of the invention is to provide an improved construction for swivel casters which may be made as a stem caster or a top plate caster, in any suitable size or of any suitable material for various purposes.

With these and other objects in view my invention consists in the construction, arrangement and combination of the various parts of my device, whereby the objects contemplated are attained, as hereinafter more fully set forth, pointed out in my claims, and illustrated in the accompanying drawing, in which:

Figure 1 is a vertical sectional view of a stem type of swivel caster, embodying my invention.

Figure 2 is a horizontal section on the line 2—2 of Figure 1, showing the upper row of bearing balls and the members which constitute the ball race.

Figure 3 is a horizontal section on the line 3—3 of Figure 1, showing the lower row of balls and the members which constitute the ball race, together with a grease retaining gasket.

Figure 4 is a vertical section through the load bearing portions of a plate type of caster, embodying my invention.

Figure 5 is a plan view of the plate type of caster.

The wheel carrying portion of the caster includes a substantially cylindrical shell 10 having a pair of spaced wings 12 and 14. Between the wings 12 and 14 a suitable caster wheel 16 is rotatably carried by an axle 18. The wheel 16 may be of any suitable type and construction, equipped with plain or anti-friction bearings, and having either a metallic or rubber or composition tread.

The axle 18 and wheel 16 are arranged in trailing relation to the vertical axis of the cylindrical shell 10 to induce easy swiveling, this being accomplished by causing the wings 12 and 14 to project downwardly and rearwardly from the central part of the shell, and a skirt 20 is provided at the rear of the bottom margin of the shell for connecting the projecting upper portions of the wings 12 and 14.

The cylindrical shell 10 is formed at its upper margin with a horizontal portion 22 of annular form having a circular opening at its center defined by a downwardly extending flange 24.

The load bearing portion of the caster includes a circular top plate 26 provided with a downwardly extending flange 28 at its outer margin forming a continuation of and spaced slightly above the cylindrical shell 10.

Mounted within the peripheral flange 28 of the top plate is an annular ball race member including a horizontal portion 30 resting on the horizontal portion 22 of the shell, and an upstanding portion 32 arranged concentrically of and spaced slightly within the downturned flange 28 of the top plate. The horizontal portion 30 of the ball race is shaped to fit smoothly and snugly against the upper surface of the horizontal portion 22 of the shell and when the parts are assembled these members are held firmly and rigidly together. The horizontal portion 30 of the ball race preferably is formed at its inner margin with a slightly downturned lip 34 overhanging the inner edge of the horizontal portion 22 of the shell.

Within the ball race member just described are mounted a series of bearing balls 36 which contact with the upper surface of the horizontal portion 30 and with the inner surface of the upstanding portion 32, and also contact with the lower surface of the top plate 26.

A retaining plate 38 is mounted within the shell 10 and is formed at its outer margin with an upstanding flange 40 which is spaced approximately mid-way between the wall of the shell and its inner down-turned flange 24.

A series of bearing balls 42 are mounted on the retaining plate 38 and between the upturned flange 40 thereof and the downturned flange 24 of the shell, said balls also contacting with the lower surface of the horizontal part 22 of the shell.

Between the top plate 26 and retaining plate 28 is mounted a spacing sleeve 44 and through said sleeve a securing member such as a stem 46 is mounted. The stem 46 is formed with a head or upset portion 48 at its lower end engaging the lower surface of the retaining plate 38 and is also formed between its ends with a shoulder 50 engaging the upper surface of the top plate whereby the parts are held in assembled relation. The upper portion of the stem 46 may be employed in the ordinary manner for attaching the caster to a load object.

The lower portion of the spacing sleeve 44 preferably fits snugly about the stem 46, but the upper portion thereof is flared outwardly and forms an inner bearing for the upper row of balls 36. The balls 36 preferably are of larger diameter and greater strength than the balls 42 as they are designed to carry the greater portion of the load.

The two annular rows of balls 36 and 42 provide ample anti-friction means for swivelly supporting the load bearing and wheel carrying portions of the caster relative to each other.

It is desirable to provide means for constantly lubricating the bearing balls 36 and 42 and I have so constructed the swiveling parts that lubricating grease may be mounted within the annular chamber defined at its inner margin by the spacing sleeve 44 and at its outer margin by the cylindrical shell 10 and cylindrical flange 28. This chamber is rendered grease-tight by an annular gasket 52 mounted between the shell 10 and upstanding flange 40 of the retaining plate and by an annular gasket 54 mounted between the horizontal portion 22 of the shell and the lower edge of the peripheral flange 28 of the top plate. The annular chamber thus formed may be supplied with grease or hard oil which will continue to lubricate the bearing balls 42 and 36 and other movable parts over a long period of use and thus add greatly to the efficiency and lasting qualities of the swiveling parts.

The lower part of the shell 10 is further closed by a circular concaved plate 56 which has its edges in engagement with the lower edge of the gasket 52 and serves to hold said gasket in place and also to further assist in preventing the escape of lubricant from the grease chamber. The concaved plate 56 is fitted tightly within the lower end of the shell 10 and forms an imperforate closure for the bottom of the swiveling chamber and assembly.

In case it is desired to employ my improvements in a plate type of caster, an additional attaching plate 58 would be mounted on the top plate 26, this attaching plate being of larger dimension than the top plate, and being provided with suitable apertures such as 60 for receiving screws or bolts to attach the caster to the lower surface of a load object.

In this construction the stem 46 is replaced by a rivet 62 having a head 64 at its lower end engaging the lower surface of the retaining member 38 and at its upper end a head 66 which preferably is countersunk in the upper surface of the attaching plate 58. The other parts of the caster may be identical with the parts previously described.

My improved swivel caster is capable of being made in many different sizes and from different materials to adapt it for different purposes. It is so constructed as to induce easy relative turning of the swiveling parts and the provision for a grease-tight swiveling chamber is of great advantage in keeping the caster in efficient condition over a long period of use.

Some changes may be made in the construction and arrangement of the parts of my device without departing from the real spirit and purpose of my invention, and it is my intention to cover by my claims, any modified forms of structure or use of mechanical equivalents, which may be reasonably included within their scope.

I claim as my invention:—

1. A swivel caster comprising a wheel-carrying member including a downwardly opening cylindrical part, a load-bearing member having a downwardly opening cylindrical part arranged above the first named member and communicating centrally with the interior thereof, an imperforate closing plate mounted in the lower end of the cylindrical part of the wheel-carrying member, and an annular gasket mounted between the cylindrical part of the wheel-carrying member and the open lower end of the cylindrical part of the load-bearing member.

2. A swivel caster comprising a wheel-carrying member including a downwardly opening cylindrical part, a load-bearing member having a downwardly opening cylindrical part arranged above the first named member and communicating centrally with the interior thereof, an imperforate closing plate mounted in the lower end of the cylindrical part of the wheel-carrying member, an annular gasket mounted within and against the wall of the cylindrical part of the wheel-carrying member and contacting with the peripheral portion of said closing plate, and an annular gasket mounted between the cylindrical part of the wheel-carrying member and the open lower end of the cylindrical part of the load-bearing member.

3. A swivel caster comprising a wheel-carrying member including a downwardly opening cylindrical part, a load-bearing member having a downwardly opening cylindrical part arranged above the first named member and communicating centrally with the interior thereof, an imperforate closing plate mounted in the lower end of the cylindrical part of the wheel-carrying member, an upwardly opening cup-shaped retaining plate mounted in the cylindrical part of the wheel-carrying member beneath the central communication with said load-bearing member, an annular gasket mounted snugly between the wall of said cup-shaped retaining member and the wall of the cylindrical part of the wheel-carrying member in engagement with the peripheral portion of the closing plate, and an annular gasket mounted between the cylindrical part of the wheel-carrying member and the open lower end of the cylindrical part of the load-bearing member.

4. In a swivel caster, a cylindrical load-bearing member, a downwardly opening cylindrical wheel-carrying member swivelly attached thereto, an annular gasket mounted between the peripheral portions of said cylindrical members, a retaining plate mounted within the cylindrical wheel-carrying member, an annular gasket mounted between the peripheral portion of said retaining plate and the wall of said wheel-carrying member, and an imperforate closing plate mounted beneath said retaining plate and snugly fitted within the wall of said cylindrical wheel-carrying member for forming a chamber for lubricant.

5. A swivel caster comprising a cylindrical load-bearing member formed with a flat horizontal central apertured portion and an outer right-angled downturned flange; a wheel-carrying member formed with wheel-supporting portions, a cylindrical perpendicular shell, and a flat, horizontal top with a central right-angled, downturned flange, the inner angles forming bearing surfaces; a cup-shaped bearing member formed with a horizontal portion fitting snugly the upper surface of the horizontal portion of said wheel-carrying member, and an outer right-angled upturned flange spaced inside said load-carrying member; an annular series of bearing balls within said cup-shaped bearing member and engaging beneath the horizontal portion at the top of said load-bearing member; a retaining member or keeper located within and spaced from said wheel-carrying member, formed with a central apertured horizontal portion and with an outer right-angled upturned flange, the inner angles forming bearing surfaces; a spacing and bearing member, centrally located within the assembly of said members, contacting the under surface of the horizontal portion of said load-bearing member and the upper surface of the horizontal portion of said retaining member or keeper, formed with its lower portion spaced within the central portions of said wheel-carrying member and said cup-shaped bearing member, its upper portion flaring outward and upward and then extending perpendicularly, and this perpendicular portion acting as an inner bearing surface for said bearing balls; a second annular series of bearing balls located between the coacting bearing surfaces of said wheel-carrying member and said retaining plate or keeper; and a securing member extending through the central opening of the assembly and holding said members rigidly in position.

SEIBERT W. CHESNUTT.